Nov. 2, 1965        S. T. CARTER        3,215,582
LABEL MAGAZINE
Filed Aug. 6, 1962        6 Sheets-Sheet 1

INVENTOR.
Sidney T. Carter
BY
Robert Cushman & Grover
ATT'YS

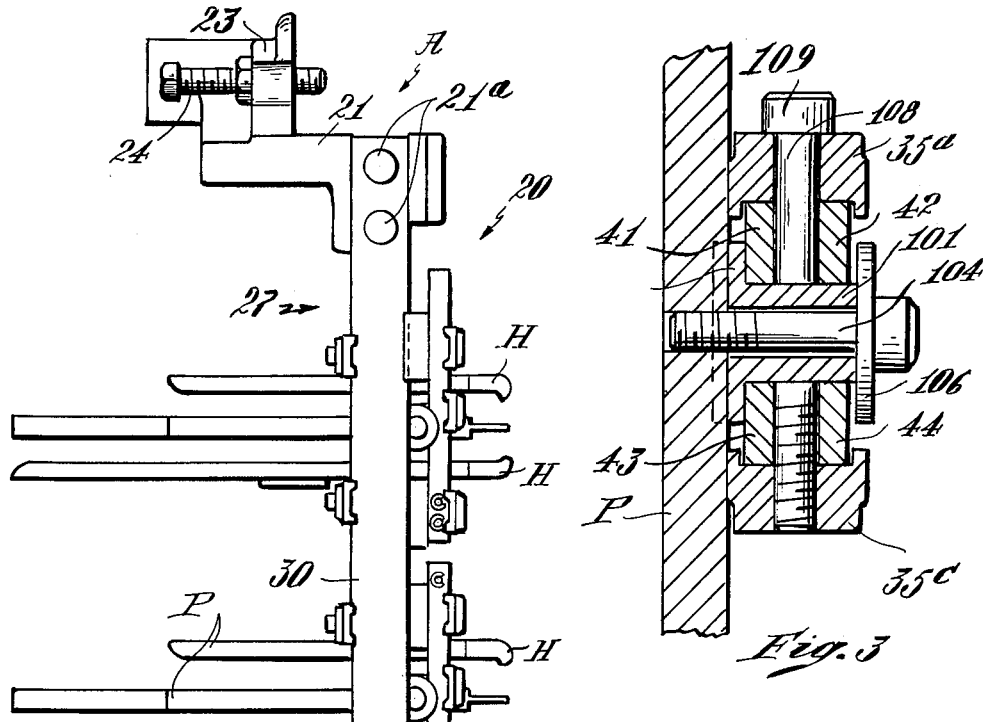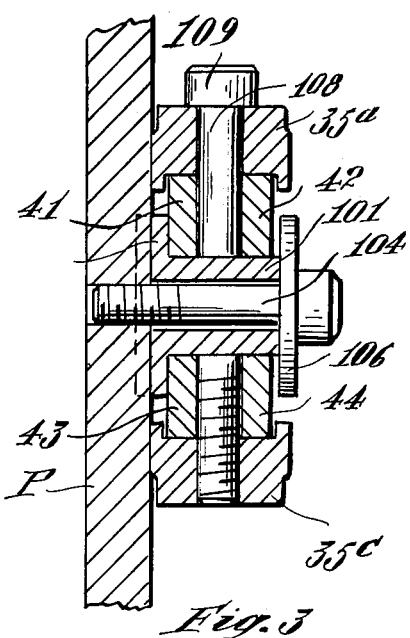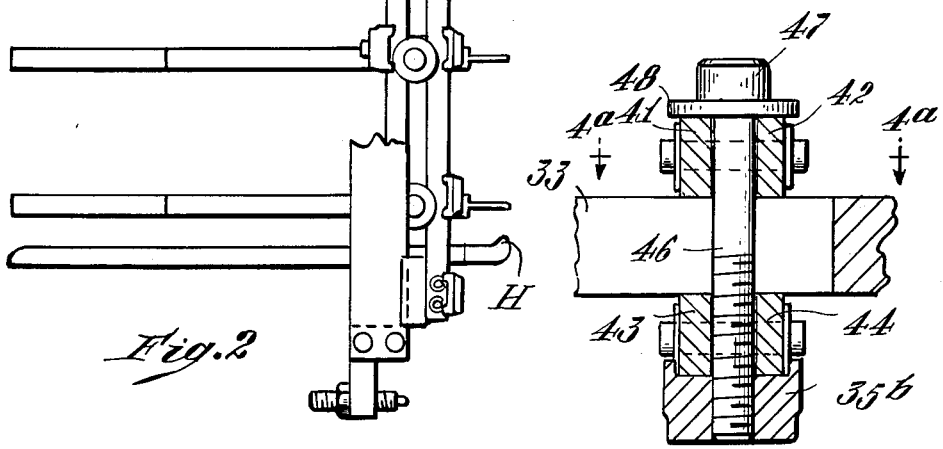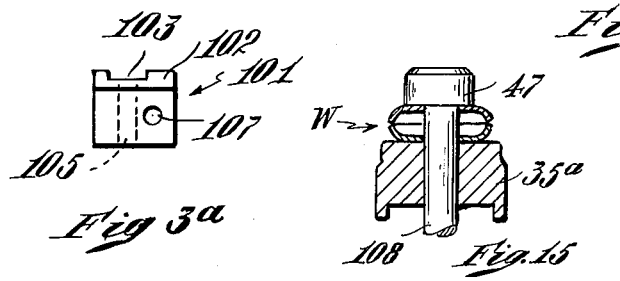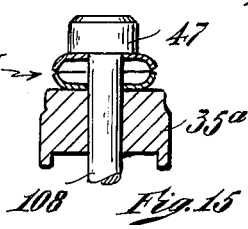

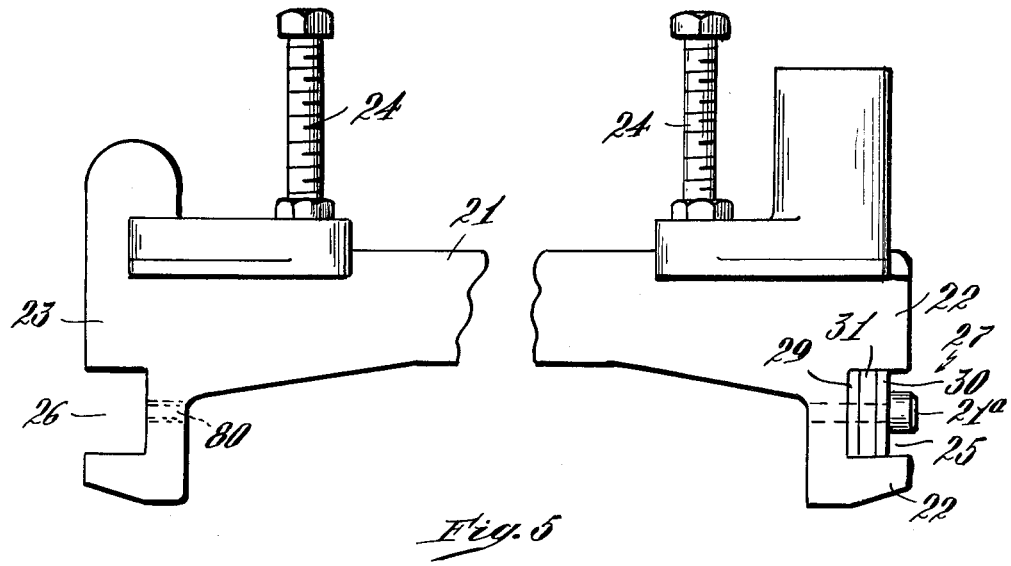
Fig. 5
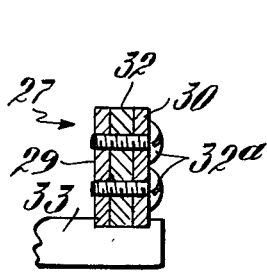
Fig. 6
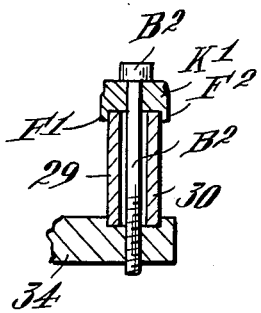
Fig. 6a
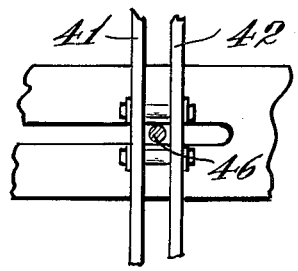
Fig. 4a
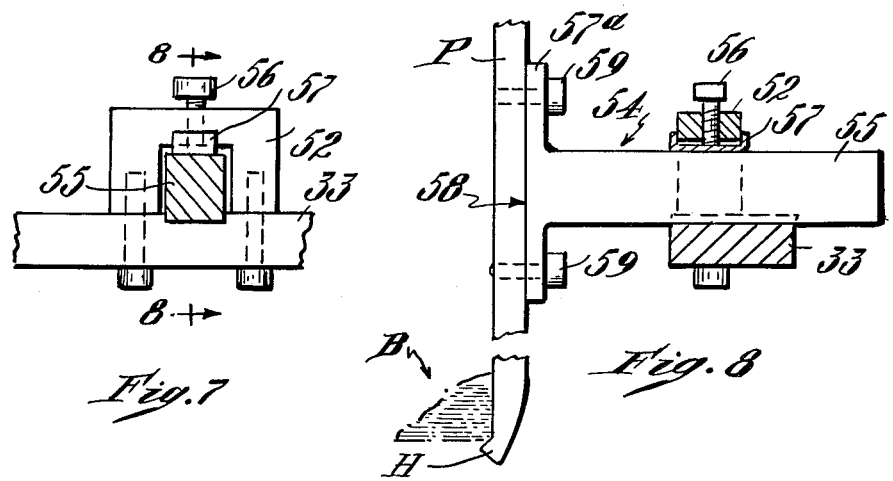
Fig. 7
Fig. 8

Nov. 2, 1965   S. T. CARTER   3,215,582
LABEL MAGAZINE
Filed Aug. 6, 1962   6 Sheets-Sheet 5

United States Patent Office 3,215,582
Patented Nov. 2, 1965

3,215,582
LABEL MAGAZINE
Sidney T. Carter, Shrewsbury, Mass., assignor to Geo. J. Meyer Manufacturing Co., Cudahy, Wis., a corporation of Wisconsin
Filed Aug. 6, 1962, Ser. No. 214,952
16 Claims. (Cl. 156—564)

This invention pertains to label-applying apparatus and more especially to a novel label holder or magazine for use in such apparatus.

In adhesively attaching labels by automatic mechanism to bottles or other articles, it is customary to place a stack of labels, all of the same size and shape, in a holder so designed as to keep the labels constituting the stack accurately oriented and so confined that a picker device, either of the adhesively-coated type or of the suction type, may engage and remove the label exposed at one end of the stack, means being provided for applying force to the label at the opposite end of the stack so as gradually to advance the stack (as it is depleted by withdrawal of labels) in such a way as to insure that that endmost label, which is the next to be removed, shall occupy a predetermined position for engagement by the picker.

A label holder or magazine of this general type is disclosed, for example, in the patent to Woodland, No. 917,509, dated April 6, 1909, wherein the magazine is disclosed as comprising a rigid frame which may be secured to the frame of the labeling machine of which the magazine is to be a part, the magazine frame including spaced parallel, rigid rods upon which so-called "stake-supporting members" are mounted. To these stake-supporting members the stakes or label-positioning prongs (which collectively form the walls of the label compartment) are attached. Like most label-holding magazines, that of the above patent to Woodland is primarily intended to hold labels which are rectangular in shape and the stakes or prongs are arranged so that some of the prongs engage the opposite lateral edges of the label while other prongs are arranged to engage the front and rear edges of the labels (it being assumed, for purposes of description, that the labels are horizontal). In order to accommodate labels of different sizes, the stake-supporting members are so relatively movable that the stakes or prongs, which engage the lateral edges of the labels, may be moved inwardly or outwardly to accommodate labels of different widths, while the holders which carry the stakes which engage the front and rear edges of the labels may likewise be moved toward or from each other to accommodate labels which differ from front-to-rear in size.

Such a magazine is acceptable for use in dealing with labels of rectangular shape and, in fact, for use with labels of certain other shapes, in particular, those which are symmetrical, but for labels which are unsymmetrical, with reference to rectangular coordinates or which have one or more curved edges, such a magazine is inadequate except possibly by the provision of expensive accessory devices whose application and adjustment is time consuming and requires much skill.

Under present highly competitive merchandising programs, the use of labels of unsymmetrical shapes is becoming more-and-more common, while the size of labels varies greatly, to an extent such that the adjustments provided for by magazines like that of the Woodland patent for example, are often insufficient in magnitude to accommodate labels through a range of sizes which may be required to be applied by a given labeling machine even during the course of one day's operation.

Thus, the inadequacy of the simple type of magazine, such as that of Woodland, requires the labeler to supply himself with an assortment of magazines, some of them perhaps capable of handling only one shape of label. This involves capital outlay in providing the necessary collection of holders, and expense in removing holders and replacing them with others, at frequent intervals.

The present invention has for an object the provision of a label magazine or holder capable of handling usual rectangular labels of a wide variety of sizes merely by adjustment of its several parts, and also of handling labels, whether they have rectilinear or curved edges, and whether symmetrical or unsymmetrical, and including those having re-entrant recesses in an edge or edges. A further object is to provide a label magazine of simple construction which may easily be adjusted to accommodate labels of different sizes and shapes and which is rigid and capable of supporting a heavy stack, consisting of large labels. A further object is to provide a label magazine or holder of what may be termed "universal type" with means for adjusting the respective stakes or label prongs with great accuracy and so that they will not change their relative positions during use.

Other and further objects and advantages of the invention will be pointed out in the following more detailed description and by reference to the accompanying drawings wherein:

FIG. 2 is a side view, with parts broken away, of the magazine of FIG. 1, looking from the right-hand side of FIG. 1;

FIG. 3 is a section, to larger scale, on the line 3—3 of FIG. 1;

FIG. 3a is a plan view (to smaller scale than FIG. 3) of a prong-supporting bracket;

FIG. 4 is a section, to larger scale, on the line 4—4 of FIG. 1;

FIG. 4a is a fragmentary section, to smaller scale, on the line 4a—4a of FIG. 4;

FIG. 5 is an end elevation showing the base member of the magazine frame, looking in the direction of the arrow A (FIG. 1), and with its midportion broken away;

FIG. 6 is a fragmentary section on the line 6—6 of FIG. 1;

FIG. 6a is a fragmentary section on the line 6a—6a of FIG. 1;

FIG. 7 is a fragmentary section on the line 7—7 of FIG. 1;

FIG. 8 is a section on the line 8—8 of FIG. 7;

FIG. 15 is a fragmentary section, illustrative of a type of spring washer beneath a bolt head.

Figure 1:
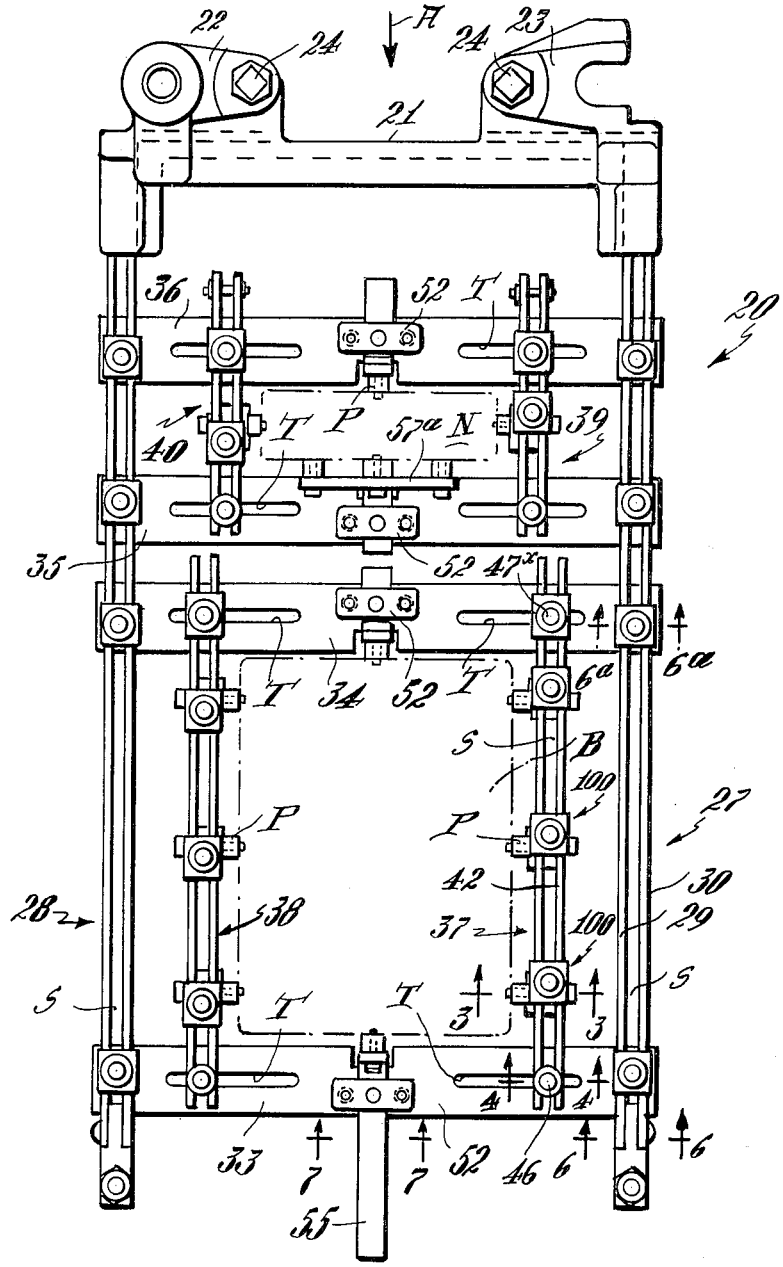
FIG. 1 is a plan view of a label magazine or holder according to the present invention, the embodiment illustrated being a holder designed to hold labels of two different kinds simultaneously, for example a body label and a neck label for application to a bottle.

Referring to the drawings and, in particular, to FIG. 1, the numeral 20 designates a label magazine, according to the present invention, the magazine, as adjusted in FIG. 1, being designed to hold substantially rectangular labels such as the body label B, indicated in broken lines, and the neck label N, also indicated in broken lines. As will be pointed out more specifically hereinafter, the magazine or holder is adapted to receive labels of rectangular form of a great variety of sizes and likewise to hold labels which are not rectangular, for instance labels having opposite edges which are divergent; edges which are curved; or labels of nonsymmetrical contour. As illustrated (FIGS. 1, 2 and 5), the magazine frame comprises a base or attaching member 21 of rigid construction, and which is conveniently a casting, and which, as here shown, has projecting brackets 22 and 23 having screw-threaded apertures for the reception of bolts 24, by means of which the frame may be attached to the frame of the labeling machine.

As shown in FIG. 5, this base member 21 has substantially rectangular recesses 25 and 26 in the bracket portions 22 and 23 and screw-threaded holes 80 extending into these recesses 25 and 26. These recesses 25 and 26 are designed to receive the rear ends of two parallel multi-ply bars 27 and 28 respectively, (FIG. 1), which fit snugly in the respective recesses and which are rigidly secured to the base member 21 by means of bolts or screws 21a (FIG. 2). Each of the bars 27 and 28 preferably consists of two elongate rails 29 and 30 of finished steel, spaced apart throughout the major portion of their lengths.

As shown in FIG. 5, the rails 29 and 30, which collectively constitute the bar 27, have their rear ends disposed in the recess 26 of the base member with a spacer member 31 interposed between them. The rails 29 and 30 may, for example, be of the order of ⅛ of an inch in transverse section and of a vertical depth of the order of ⅞ of an inch and are spaced apart approximately 3/16 of an inch. Using rails of the above suggested dimensions and for a holder such as that shown in FIG. 1, designed to hold two label stacks, the total lengths of the bars 27 and 28 might be of the order of 15 inches; however, such dimensions are suggested merely by way of example, it being obvious that the relative dimensions may be varied without departing from the principle of the invention.

As shown in FIG. 6, the rails 29 and 30 are spaced at their forward ends by a spacer member 32 and rigidly connected by bolts 32a. The bars 27 and 28 are thus, in general, rectangular in contour, although each bar, because of its multi-ply construction, has a longitudinally extending slot S (FIG. 1) of uniform width.

These rigid, parallel bars 27 and 28 carry one or more pairs of parallel supports (according to the number of label stacks to be held), two such pairs (comprised of the supports 33, 34 and 35, 36, respectively) being shown in FIG. 1. Each of these supports may, for example, be a finished bar of steel, rectangular in transverse section, and, for example, of the order of ⅜ of an inch in thickness and 1 inch in width, but here again dimensions are cited merely by way of example and without limitation. Each of these supports, for example the support 34 (FIG. 6a), is provided near each of its opposite ends with a shallow channel forming a seat for one of the bars 27 and 28 respectively. That portion of each of the bars 27 and 28, which seats in the channel of one of the supports, for example the support 34 (FIG. 6a), is secured to the support by a bolt B² whose head engages the upper surface of a shoe K¹ having spaced side flanges F¹, F² which engage the outer faces of the rails 29 and 30, the bolt passing down between the rails and having threaded engagement with a hole in the corresponding support 34.

By thus connecting the supports 33, 34 and so forth, to the bars 27 and 28, it is possible, by loosening the bolts B², to move the supports bodily toward or from each other along the bars while maintaining them in parallel relation. Thus, as shown in FIG. 1, the supports 33 and 34 are spaced apart a distance to provide between them room for a stack of large labels B, while the supports 35 and 36 are spaced apart a much smaller distance, providing space for a stack of narrow labels N.

For supporting those label-positioning prongs P which engage the opposite lateral edges of the labels, there are provided, as here illustrated (FIG. 1), two prong carriers 37 and 38 for holding the prongs which engage the opposite lateral edges of the large labels B, and two prong carriers 39 and 40 which support the prongs which engage the lateral edges of the smaller label N.

These prong carriers are of like construction and thus, but one of them, for example the carrier 37, will be described in detail. This carrier (FIG. 3) comprises four parallel rails 41, 42 and 43, 44, each rail being of polished steel, rectangular in transverse section and, for example, approximately 3/32 of an inch wide and 5/16 of an inch in depth, these dimensions merely being by way of illustration and not limiting.

Each of the supports 33, 34, 35 and 36 is provided, adjacent to its opposite ends respectively, with elongate slots T (FIG. 1), these slots being at right angles to the bars 27 and 28. At the forward end of the carrier 37 (FIG. 4), its rails 41 and 42 are disposed above the slotted portion of the support 33, while its rails 43 and 44 are below the support 33. At this point (FIG. 4), a bolt 46, having a head 47 and radial flange 48, passes downwardly between the rails 41 and 42 and through the slot T in the member 33 and then down between the rails 43 and 44 and has screw-threaded engagement with a flanged shoe 35b, for example like the shoe K¹ above described. The external diameter of the threaded portion of the bolt 46 is such that the bolt keeps the rails 41 and 42 and the rails 43 and 44 properly spaced from each other while the bolt normally prevents the forward end portion of the carrier 37 from shifting longitudinally of the support 33.

At is rear end the carrier 37 is similarly connected to the support 34 by a bolt 47x (FIG. 1) which passes down through the slot T in the support 34.

As illustrated in FIG. 1, each of the prong carriers 37 and 38 is provided with three prong holder assemblies 100, each having attached thereto a label-positioning prong P. These prongs are of generally conventional type, each consisting of a substantially rectilinear bar desirably of a metal which is not readily corroded by contact with the adhesive employed in attaching the labels. For instance, these bars may be of brass or bronze. Each bar is generally rectangular in transverse section and each is provided, at its lower end, with a hook portion H (FIGS. 2 and 8), operative to retain the lowermost label of the stack in position in readiness to be contacted by and withdrawn from the label holder by the picker.

In FIGS. 3 and 3a one of these prong-holding assemblies 100 is shown as comprising a holder 101 (FIG. 3a), desirably rectangular in vertical section (FIG. 3), which is slidable in the slot defined by the lower edges of the rails 41 and 42 and the upper edges of the rails 43 and 44. This holder 101 also has a portion 102 provided with a vertical slot 103 (FIG. 3a) of a width to receive the shank of one of the prongs P, the latter having a screw-threaded opening which receives the threaded end of a bolt 104 passing through a hole 105 in the holder 101, said bolt (FIG. 3) having a flange 106 which engages the outer surface of the holder 101, the parts being so dimensioned that, when the screw has been set up tight, the flange 106 is spaced slightly from the adjacent rails 42 and 44.

The holder 101 has a second hole 107 (FIG. 3a) offset from the opening which receives the bolt 104, and a bolt 108 (FIG. 3) having a head 109, passes down through an opening in a shoe 35a, having flanges which engage the outer faces of the rails 41 and 42, and between the rails 41 and 42; through the hole 107 in the holder 101; and between the rails 43 and 44, and has screw-threaded engagement with a shoe 35c having flanges which engage the outer surfaces of the rails 43 and 44. Desirably, the outer surfaces of the flanges of those shoes 35a and 35c, which are opposed to the prong P, are smoothly and accurately finished thereby to provide steadying means for the prong to insure retention of its adjusted position.

As shown, for example in FIG. 1, and as above described, the prong carriers 37 and 38 are parallel so that the prongs, which are carried thereby, define the sides of a substantially rectangular space for labels such as the label B. However, by the provision of the elongate slots T in the carrier supports 33, 34, 35 and 36, and the slots between the rails 41, 42 and 43, 44 of the prong carriers, it is possible to vary the relative positions of the prong carriers and thus change the dimensions and/or shapes of the label-receiving chambers defined by the prongs.

Thus, for example, by loosening the bolts 46 and 47x (FIG. 1), which normally secure the carrier 37 in fixed position relative to the supports 33 and 34, the carrier 37, for example, may be moved bodily toward or from the carrier 38 while remaining parallel to the carrier 38, thus narrowing the chamber defined by the prongs while still retaining its rectangular shape. Obviously, both carriers 37 and 38 may thus be moved. On the other hand, after having loosened the bolts 46 and 47x, the carrier 37 may be swung, for example, about the axis of the bolt 46 while the bolt 47x moves along the slot T in the support 34 so that the label-receiving chamber, defined by the prongs, is no longer rectangular. Thus the chamber would still have parallel front and rear walls while one of the side walls of the label-receiving chamber diverges at an angle of less-or-more than 90° with reference to the length of the support 3. Moreover, if both of the carriers be so swung, the label-receiving chamber may become of rhombic, trapezoidal or even approximately triangular in transverse section.

Ordinarily, it is unnecessary to provide more than one label-positioning prong for defining the front and rear walls, respectively, of the label-receiving chamber and, as here illustrated (FIG. 1), each of the supports 33, 34, 35 and 36 is provided with but a single prong-holding device. Thus, as shown, for example in FIGS. 7 and 8, the support 33 is provided with a bracket 52 located approximately midway between the ends of the support and which is secured to the upper surface of the support by screws or other appropriate fastening means.

The prong holder 54, as shown in FIG. 8, comprises a stem portion 55 which is arranged to slide in a rectangular guideway in the bracket 52, the latter being provided with a screw-threaded opening for the reception of a clamping screw 56 which may be tightened to retain the stem portion 55 of the holder in adjusted position. Since those parts of the apparatus which may come in contact with the adhesive employed are desirably of material which is not easily corroded, for example brass, and thus relatively soft, it is preferred to interpose a protective shoe 57 of polished steel and between the upper surface of the stem 55 of the holder and the tip of the clamping screw 56.

The holder 54 also comprises the vertically elongate head portion 57a having a smoothly finished, vertical, outer face 58 for contact with the shank of the prong and has screw-threaded openings for the reception of bolts 59 designed to engage threaded openings in the shank of the prong P, thereby to hold the prong in assembled relation to the holder 54. Similar brackets 52, with prong holders such as just described, are mounted upon each of the supports 33, 34, 35 and 36 except that the head 57a of the prong holder mounted in the bracket 52 on the support 35 is here shown as arranged to hold three separate prongs in order to insure the proper location of the very narrow labels N, whose opposite narrow ends are positioned each by a single prong.

Figure 9:
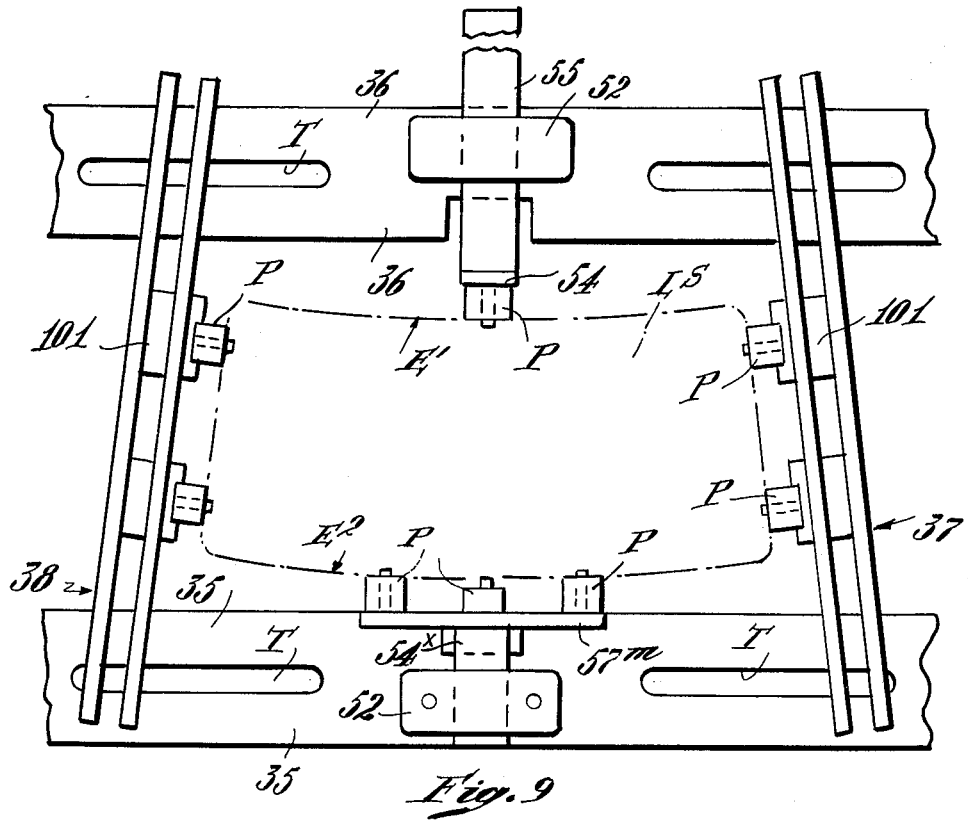
FIGS. 9, 10, 11, 12 and 13 are fragmentary plan views, to larger scale than FIG. 1, showing the capability of the magazine or holder of the present invention to handle labels of widely different shapes.

FIG. 9 is illustrative of the capability of the magazine to receive labels of the shape of the label $L^s$ whose end edges converge so that its edge $E^1$ is less in length than its edge $E^2$. For positioning a label of this shape the prong carriers 38 and 39 are shown as having been swung so that they converge like the end edges of the label. In this instance, each prong carrier supports but two prongs P, while the prong holder 54, carried the support 36, has but a single centrally located prong P to engage the concavely curved edge $E^1$ of the label. With this arrangement, in order to insure the proper positioning of the label stack, the prong holder 54x is provided with a transversely elongate head 57m which carries three transversely spaced prongs P engageable with the convexly curved edge $E^2$ of the label.

Figure 10:
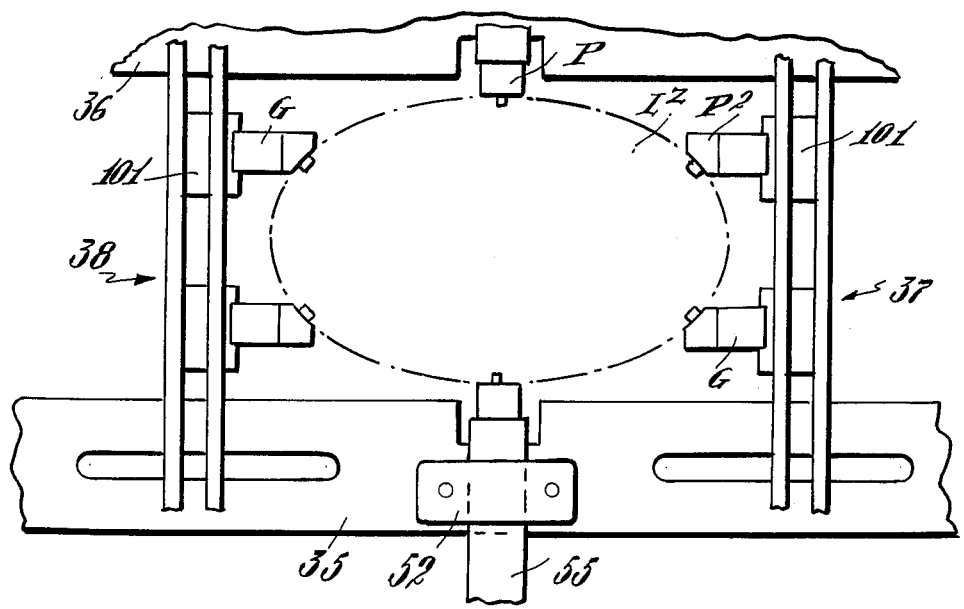

In FIG. 10 another arrangement of the prong carriers is illustrated and which is designed for positioning an oval label $L^z$. With this arrangement the carriers 37 and 38 are parallel and at right angles to the supports 35 and 36 and each is provided with two prongs holders 101, but in this instance the prongs $P^2$ are specially contoured, with concavely curved faces for contact with the curved edge of the label. Furthermore, in this arrangement, in order to prevent contact of the narrow ends of the label with the carriers, the prongs are mounted upon spacer elements G which, in turn, are secured to the prong holders. In this instance, a single prong P of conventional type is arranged to engage the front and rear edges, respectively, of the label $L^2$.

Figure 11:
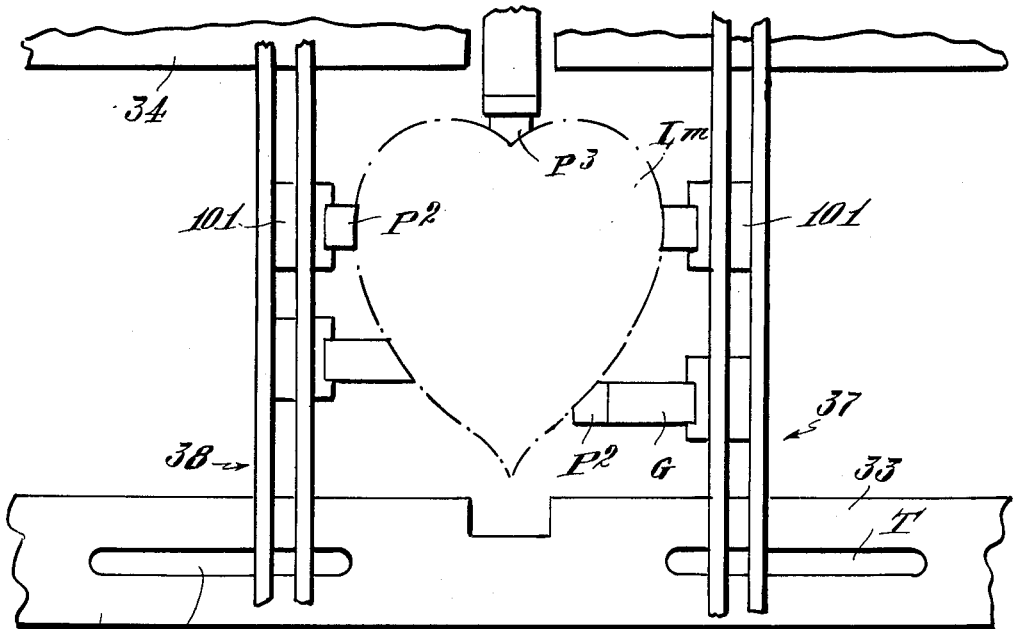

In FIG. 11 the prong carriers 37 and 38 are arranged in parallel relation and at right angles to the support 33, but with provision for positioning a label $L^m$ of heart shape. In this instance the label holder, which is carried by the support 34, is provided with a specially shaped prong $P^3$ having surfaces designed to contact the edge of the label at its re-entrant portion, while the holders 101, mounted on the carriers 37 and 38, are provided with prongs $P^2$ having curved faces shaped to engage the curved edges of the label $L^m$, those prongs which engage the narrower portion of the label being mounted upon spacers G attached to the prong holders.

Figure 12:
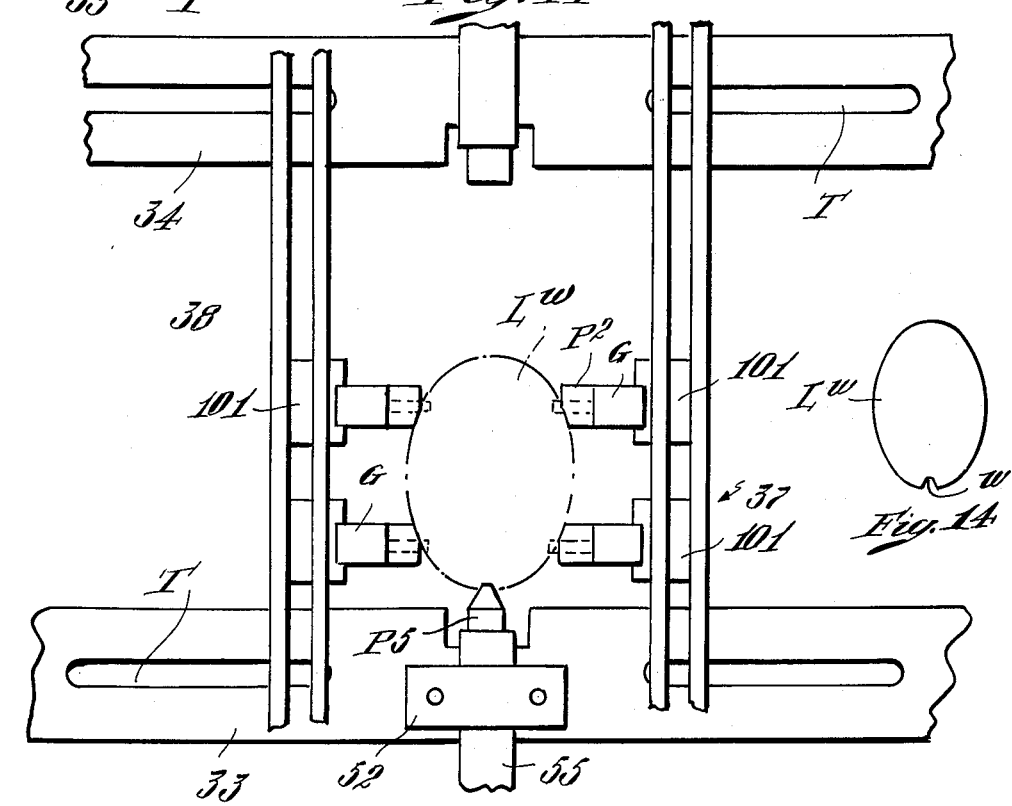
Figure 14:
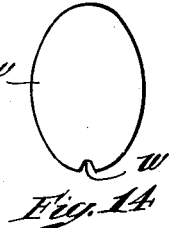
FIG. 14 is a plan view of a label such as indicated in broken lines in FIG 12.

FIG. 12 shows the magazine arranged to hold a very small label $L^w$ of elliptical shape having a notch W (FIG. 14) at one end. For holding such a label the prong carriers 37 and 38 are shown as having been moved toward each other substantially as far as they are permitted to do by the slots T, the carriers being in parallel relation and at right angles to the members 33 and 34. In this arrangement the prongs $P^2$, carried by the holders 101, are of special shape, having curved surfaces of the proper curvature to engage the curved edges of the label, and in order to position the prongs for holding such a small label, the prongs $P^2$ are mounted upon spacers G secured to the prong holders. The prong holder which is carried by the support 33, is provided with a prong $P^5$ of special shape, having an edge designed to fit within the notch W of the label, thus accurately holding the small label in properly oriented position.

Figure 13:
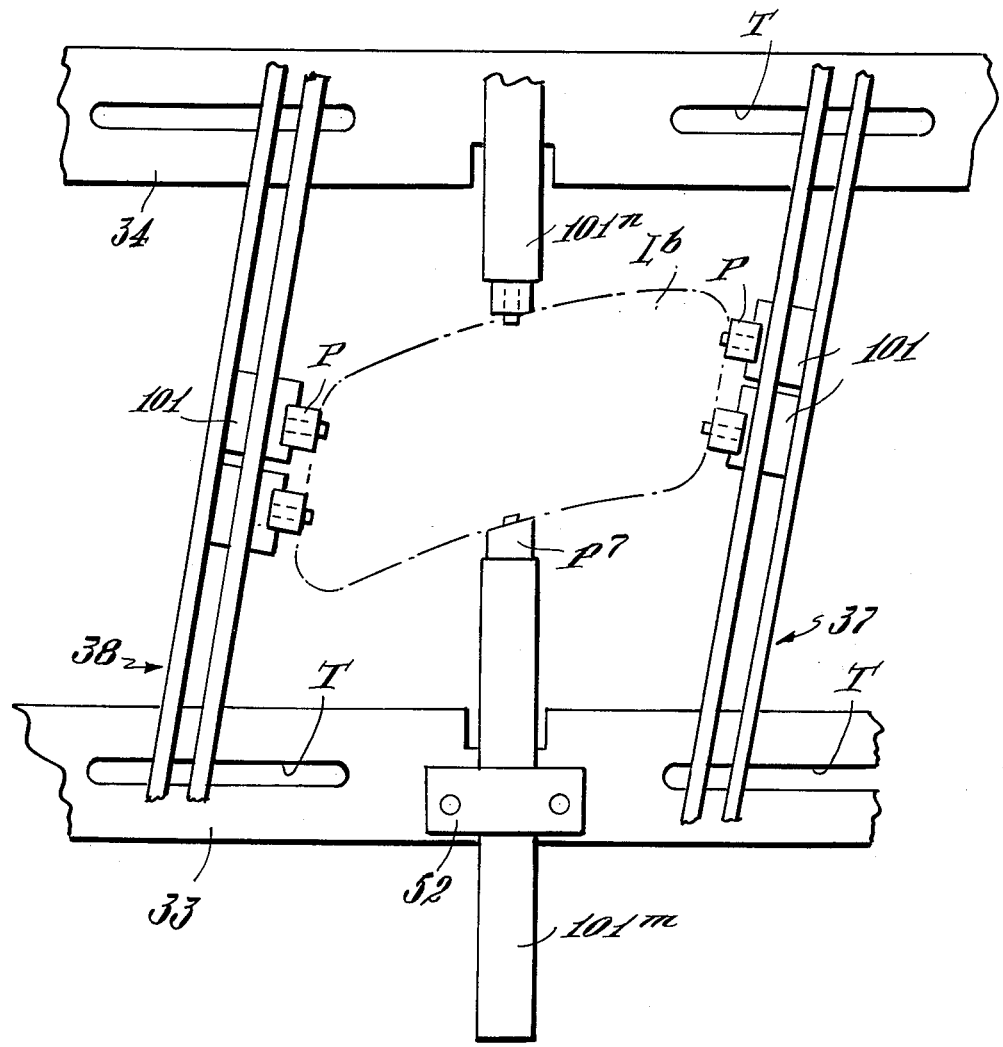

In FIG. 13 an arrangement of the prong carriers is illustrated, by means of which an unsymmetrical label $L^b$, such as shown, may be properly positioned. This label may be a special shoulder label, for example, whose end edges are parallel but inclined at an angle less than 90° relatively to the length of the support 33, while the front and rear edges of this label, although slightly curved, are inclined in the opposite direction from the end edges.

For supporting such an unsymmetrical label, the prong carriers 37 and 48, although parallel, are inclined to the length of the support 33 so as to be parallel to the end edges of the label and thus, together with the supports 33 and 34, defining the walls of a chamber of rhomboidal contour. The prong-supporting holders 101 each carry two prongs P of conventional type operative to engage the substantially straight end edges of the label, while the prong P⁷, mounted on the holder 101m, carried by the support 33, has a surface curved to conform to the forword, concave, transverse edge of the label, while the prong P, mounted on the holder 101n, carried by the support 34, is so shaped as to fit snugly against the upper convexly curved edge of the label.

The arrangements illustrated in FIGS. 9 to 14 inclusive, are merely by way of example of the wide utility of the label holder of the present invention and indicative of the fact that it is capable of holding labels of a very wide range of sizes and shapes and whether such labels be symmetrical with respect to rectangular coordinates passing through the center of the area of the label, or whether the label by unsymmetrical with respect to such coordinates.

Desirably, a spring washer W (FIG. 15), for example of the Bellville type, is arranged beneath the head of each of the bolts 46, 47, 108, B², etc., the cupping of the washer, as shown, being much exaggerated.

Thus, for holding labels of a great variety of shapes and sizes, the same magazine may be used, the only requirement as to certain unusual shapes of label being that the prongs themselves, which are relatively inexpensive to make, be properly contoured to fit the edge of the particular label which is to be used.

While certain desirable embodiments of the invention have herein been disclosed by way of example, it is to be understood that the invention is broadly inclusive of any and all modifications, either as to structure, dimensions or materials employed, which may be construed as equivalents of the terms defined in the claims.

I claim:

1. A label magazine for use in a labeling machine, said magazine having a rigid frame comprising a base member shaped for attachment to the frame of the labeling machine and a pair of parallel bars each rigidly secured at one end to the base member, at least two rigid, parallel, spaced elongate supports each attached at its opposite ends, respectively, to one of said bars, a plurality of elongate, rigid prong carriers mounted on and extending from one of said supports to the next, and means so connecting the prong carriers to the supports that each prong carrier may be moved bodily, independently of the other, toward or from the other while parallel to the other, and also from a position of parallelism to selected positions of relative divergence, and means for attaching label-positioning prongs to said carriers.

2. A label magazine according to claim 1, further characterized in that at least one of the elongate supports has a longitudinally extending slot therein, at least one of the prong carriers having a positioning element disposed in said slot and which is adjustable lengthwise of the slot, and means whereby said positioning element may be clamped in adjusted position.

3. A label magazine according to claim 2, further characterized in that each prong carrier has a longitudinally extending slot, a prong holder, comprising an element which is adjustably movable along the slot in a carrier, and means whereby said element may be fixed in adjusted position relatively to the carrier.

4. A label magazine according to claim 1, further characterized in that each of the parallel bars, which is attached to the base member, is provided with an elongate slot and the opposite ends of each elongate support are attached to one, respectively, of said bars, the means for attaching each support to a bar comprising an element which is longitudinally adjustable along the slot of a corresponding one of said parallel bars whereby the supports may be adjusted toward or from each other, and means whereby said element may be fixed in adjusted position in said slot.

5. A label magazine according to claim 4, further characterized in that each of said elongate supports is provided with a bracket defining a guideway extending transversely of the support, a prong holder comprising a part which is slidable within said guideway, means for fixing the holder in adjusted position, and means for securing a label-positioning prong to said holder.

6. A label magazine according to claim 5, wherein the holder for the label-positioning prong is of T-shape, comprising a stem which slides in the guideway and which is of a metal relatively soft as compared with steel, a clamping screw for retaining said stem in adjusted position, and a protecting element interposed between the stem and the screw thereby to prevent the screw from indenting the metal of the stem.

7. A label magazine according to claim 1, further characterized in that each of the parallel bars, which are rigidly secured to the base member, consists of two parallel, elongate, steel rails, means for spacing said rails to provide a slot between them, and means for rigidly holding said rails in assembled relation.

8. A label magazine according to claim 1, wherein a plurality of label-contacting prongs collectively constitute the wall of a chamber for the reception of a stack of labels, said magazine comprising means, including relatively movable prong-supporting devices, such that the prongs may be relatively adjusted so as selectively to define a chamber for the reception of labels of symmetrical or unsymmetrical shape respectively.

9. A label magazine according to claim 8, comprising means whereby the prongs may be so relatively adjusted as, at will, to define a chamber for the reception of rectangular labels or, alternatively, to define a chamber, at least two of whose walls diverge from each other at an angle less than 90°.

10. A label magazine according to claim 1, wherein a plurality of parallel prongs collectively define one wall of a label-receiving chamber, an elongate rigid prong carrier, prong holders mounted on said carrier, one for each respective prong, and means whereby each holder may be adjusted individually, longitudinally of the carrier.

11. A label magazine according to claim 10, wherein the prong carrier comprises upper and lower parts defining between them an elongate slot providing a guideway for the prong holders, means operative to retain each holder in the slot, and means for clamping each holder in adjusted position lengthwise of the slot.

12. A label magazine according to claim 10, wherein the prong carrier comprises a pair of parallel upper rails and a pair of parallel lower rails, the upper and lower rails of each respective pair being spaced to provide an elongate slot and the rails of each pair being spaced apart to provide elongate slots between them, the prong holder having a portion which slides in the slot between the upper and lower rails, and means for clamping the holder in adjusted position.

13. A label magazine according to claim 12, wherein the means for clamping the holder in adjusted position comprises a pair of shoes engageable with the upper and lower rails, respectively, and slidable relatively to said rails, and a clamping bolt extending through one of said shoes and through the slots between the two pairs of rails and through an opening in the holder, said bolt having screw-threaded engagement with a threaded opening in the other of said shoes.

14. A label magazine according to claim 13, wherein the upper and lower rails of the prong carrier are of polished steel and the clamping shoes for the holder have transversely spaced flanges which engage the vertical faces of the rails thereby to prevent accidental orientation of the shoes relative to the carrier.

15. A label magazine comprising relatively fixed, rigid, parallel bars, spaced apart a distance exceeding the width of the widest label to be employed, rigid, parallel, spaced supports normally fixed relatively to each other and secured to the bars and spaced apart a distance exceeding the front-to-rear width of the longest label to be employed, a pair of elongate prong carriers extending from one support to the next and means so connecting the carriers to the supports that the carriers may be moved bodily toward or away from each other while keeping them parallel or may be swung about pivotal axes so that they are no longer parallel, means for securing the carriers in selected position of relative adjustment, prong holders mounted on the carriers, said holders being individually adjustable lengthwise of the respective carriers, and prongs mounted on the holders operative to define the walls of a label-receiving compartment.

16. A label magazine according to claim 15, wherein each of the supports has an elongate slot and the prong carrier is provided with a bolt passing through said slot and which, when tightened, is operative to prevent movement of the carrier and support but which, when loosened, is operative to constitute a pivot about which the carrier may be swung.

References Cited by the Examiner
UNITED STATES PATENTS 917,509   4/09   Woodland _____ 156—560

EARL M. BERGERT, *Primary Examiner.*